US010666686B1

(12) United States Patent
Singh et al.

(10) Patent No.: US 10,666,686 B1
(45) Date of Patent: *May 26, 2020

(54) VIRTUALIZED EXPLOIT DETECTION SYSTEM

(71) Applicant: FireEye, Inc., Milpitas, CA (US)

(72) Inventors: Japneet Singh, Bangalore (IN); Harinath Ramchetty, Bangalore (IN); Anil Gupta, Bangalore (IN)

(73) Assignee: FireEye, Inc., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/208,378

(22) Filed: Dec. 3, 2018

Related U.S. Application Data

(63) Continuation of application No. 14/739,921, filed on Jun. 15, 2015, now Pat. No. 10,148,693.

(Continued)

(51) Int. Cl.
*H04L 29/06* (2006.01)
*G06F 21/00* (2013.01)
(Continued)

(52) U.S. Cl.
CPC .............. *H04L 63/20* (2013.01); *G06F 21/00* (2013.01); *G06F 21/566* (2013.01);
(Continued)

(58) Field of Classification Search
CPC . H04L 63/14; H04L 63/1408; H04L 63/1416; H04L 63/1425; H04L 63/1441;
(Continued)

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/about.chris/research/doc/esec07.sub.--mining.pdf-.

(Continued)

*Primary Examiner* — Ayoub Alata
(74) *Attorney, Agent, or Firm* — Rutan & Tucker, LLP

(57) ABSTRACT

According to one embodiment, a virtualized malware detection system is integrated with a virtual machine host including a plurality of virtual machines and a security virtual machine. Logic within the virtual machines are configured to perform a dynamic analysis of an object and monitor for the occurrence of a triggering event. Upon detection of a triggering event within a virtual machine, the logic within the virtual machine provides the security virtual machine with information associated with the triggering event for further analysis. Based on the further analysis, the object may then be classified as "non-malicious," or "malicious."

25 Claims, 8 Drawing Sheets

Related U.S. Application Data

(60) Provisional application No. 62/138,309, filed on Mar. 25, 2015.

(51) Int. Cl.
*H04L 29/08* (2006.01)
*G06F 21/56* (2013.01)

(52) U.S. Cl.
CPC ........ *H04L 63/145* (2013.01); *H04L 63/1416* (2013.01); *H04L 67/10* (2013.01)

(58) Field of Classification Search
CPC ....... H04L 63/145; H04L 63/20; H04L 67/10; G06F 21/55; G06F 21/56; G06F 21/566; G06F 21/564; G06F 21/00
See application file for complete search history.

(56) References Cited

U.S. PATENT DOCUMENTS

| | | |
|---|---|---|
| 5,278,901 A | 1/1994 | Shieh et al. |
| 5,319,776 A | 6/1994 | Hile et al. |
| 5,440,723 A | 8/1995 | Arnold et al. |
| 5,452,442 A | 9/1995 | Kephart |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,889,973 A | 3/1999 | Moyer |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,118,382 A | 9/2000 | Hibbs et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,693,947 B2 | 4/2010 | Judge et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,818,800 B1 | 10/2010 | Lemley, III et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,072 B2 | 6/2012 | Matulic |
| 8,201,246 B1 | 6/2012 | Wu et al. |
| 8,204,984 B1 | 6/2012 | Aziz et al. |

(56) References Cited

U.S. PATENT DOCUMENTS

| | | |
|---|---|---|
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,198 B2 | 10/2012 | Mott et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,240 B2 | 11/2012 | Lorsch |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,468,604 B2 | 6/2013 | Claudatos et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 * | 8/2013 | Ranadive ............ H04L 63/1433 713/187 |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Kie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,695,097 B1 | 4/2014 | Mathes et al. |
| 8,707,437 B1 | 4/2014 | Ming-Chang et al. |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,769,692 B1 | 7/2014 | Muttik et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,879,558 B1 | 11/2014 | Rijsman |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shifter et al. |
| 8,959,428 B2 | 2/2015 | Majidian |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,009,834 B1 | 4/2015 | Ren et al. |
| 9,015,814 B1 | 4/2015 | Zakorzhevsky et al. |
| 9,027,135 B1 | 5/2015 | Aziz |
| 9,071,638 B1 | 6/2015 | Aziz et al. |
| 9,104,814 B1 | 8/2015 | Mompoint et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,165,142 B1 | 10/2015 | Sanders et al. |
| 9,171,157 B2 | 10/2015 | Flores et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,210,185 B1 | 12/2015 | Pinney Wood et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | Lemasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,246 B1 | 5/2016 | Wan et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |

(56) References Cited

U.S. PATENT DOCUMENTS

| | | |
|---|---|---|
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Shame et al. |
| 2003/0051168 A1 | 3/2003 | King et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0199569 A1 | 10/2004 | Kalkunte et al. |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0022018 A1 | 1/2005 | Szor |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |

(56) References Cited

U.S. PATENT DOCUMENTS

| | | |
|---|---|---|
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0129382 A1 | 6/2006 | Anand et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber |
| 2006/0179147 A1 | 8/2006 | Tran et al. |
| 2006/0184632 A1 | 8/2006 | Marino et al. |
| 2006/0190561 A1 | 8/2006 | Conboy et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0253906 A1 | 11/2006 | Rubin et al. |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner |
| 2007/0169195 A1 | 7/2007 | Anand et al. |
| 2007/0171824 A1 | 7/2007 | Ruello |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240215 A1 | 10/2007 | Flores et al. |
| 2007/0240217 A1 | 10/2007 | Tuvell et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler |
| 2008/0028463 A1 | 1/2008 | Dagon |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0163356 A1 | 7/2008 | Won-Jip et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrslcy et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271866 A1 | 10/2009 | Liske |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |

(56) References Cited

U.S. PATENT DOCUMENTS

| | | |
|---|---|---|
| 2010/0103837 A1 | 4/2010 | Jungck et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192057 A1 | 7/2010 | Majidian |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0275210 A1 | 10/2010 | Phillips et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2010/0306825 A1 | 12/2010 | Spivack |
| 2010/0332593 A1 | 12/2010 | Barash et al. |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173178 A1 | 7/2011 | Conboy et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Einado et al. |
| 2011/0289582 A1 | 11/2011 | Ejriwal et al. |
| 2011/0302587 A1 | 12/2011 | Nishikawa et al. |
| 2011/0302656 A1 | 12/2011 | El-Moussa |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0320816 A1 | 12/2011 | Yao et al. |
| 2012/0023593 A1 | 1/2012 | Puder |
| 2012/0054869 A1 | 3/2012 | Yen et al. |
| 2012/0066698 A1 | 3/2012 | Yanoo |
| 2012/0079596 A1 | 3/2012 | Thomas |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0167219 A1 | 6/2012 | Zaitsev et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0284710 A1 | 11/2012 | Vinberg |
| 2012/0297489 A1 | 11/2012 | Dequevy |
| 2012/0304244 A1 | 11/2012 | Xie et al. |
| 2012/0317641 A1 | 12/2012 | Coskun et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0247187 A1 | 9/2013 | Hsiao et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0305369 A1 | 11/2013 | Karta et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0333046 A1 | 12/2013 | Sambamurthy |
| 2014/0019963 A1 | 1/2014 | Deng et al. |
| 2014/0026217 A1 | 1/2014 | Saxena et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0096184 A1 | 4/2014 | Zaitsev |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0181975 A1 | 6/2014 | Spemow et al. |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0317735 A1 | 10/2014 | Kolbitsch et al. |
| 2014/0325344 A1 | 10/2014 | Bourke et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0026810 A1 | 1/2015 | Friedrichs et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0121526 A1 | 4/2015 | McLarnon et al. |
| 2015/0180886 A1 | 6/2015 | Staniford et al. |
| 2015/0186645 A1 | 7/2015 | Aziz et al. |

(56) References Cited

U.S. PATENT DOCUMENTS

| | | |
|---|---|---|
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0242627 A1 | 8/2015 | Lee et al. |
| 2015/0244732 A1 | 8/2015 | Golshan et al. |
| 2015/0363598 A1 | 12/2015 | Xu et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2016/0357965 A1 | 12/2016 | Prowell et al. |
| 2016/0359880 A1 | 12/2016 | Pang et al. |
| 2017/0083703 A1 | 3/2017 | Abbasi et al. |
| 2017/0295089 A1 | 10/2017 | Saltsidis et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 0223805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).
"Packet", Microsoft Computer Dictionary Microsoft Press, (Mar. 2002), 1 page.
"When Virtual is Better Than Real", IEEEXplore Digital Library, available at, http://ieeexplore.ieee.org/xpl/articleDetails.jso?reload=true&arnumber=990073, (Dec.7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye") (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists,org/honeypots/2003/q2/319 ("Boubalos"), (Jun. 5, 2003).
Bowen, B. M. et al "BotSwindler: Tamper Resistant Injection of Believable Decoys in VM-Based Hosts for Crimeware Detection", in Recent Advances in Intrusion Detection, SPRINGER ISBN: 978-3-642-15511-6 (pp. 118-137) (Sep. 15, 2010).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cisco "Intrusion Prevention for the Cisco ASA 5500-x Series" Data Sheet (2012).
Cisco, Configuring the Catalyst Switched Port Analyzer (SPAN) ("Cisco"), (1992-2003).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05 Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Deutsch, P., ""Zlib compressed data format specification version 3.3" RFC 1950, (1996)".
Didier Stevens, "Malicious Pdf Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase \/ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Hjelmvik, Erik, "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results (subset) for "detection of unknown computer worms". Http//ieeexplore.ieee. org/searchresult.jsp?SortField=Score&SortOrder=desc&ResultC . . . (Accessed on Aug. 28, 2009).

(56) References Cited

OTHER PUBLICATIONS

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King").
Krasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael, et al., "Simulating Realistic Network Traffic for Worm Warning System Design and Testing", Institute for Security Technology studies, Dartmouth College, ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12--final107.pdf [retrieved on Dec. 15, 2014].
Marchette, David J., Computer Intrusion Detection and Network Monitoring: A Statistical ("Marchette"), (2001).
Margolis, P.E., "Random House Webster's Computer & Internet Dictionary 3rd Edition", ISBN 0375703519, p. 595 (Dec. 1998).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34,.
Mori, Detecting Unknown Computer Viruses, 2004, Springer-Verlag Berlin Heidelberg.
Natvig, Kurt, "SandboxII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J., et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
PCT/US2014/043726 filed Jun. 23, 2014 International Search Report and Written Opinion dated Oct. 9, 2014.
PCT/US2015/067082 filed Dec. 21, 2015 International Search Report and Written Opinion dated Feb. 24, 2016.
Peter M. Chen, and Brian D. Noble, "When Virtual Is Better Than Real, Department of Electrical Engineering and Computer Science", University of Michigan ("Chen"), (2001).
Reiner Sailer, Enriquillo Valdez, Trent Jaeger, Roonald Perez, Leendert van Doom, John Linwood Griffin, Stefan Berger., sHype: Secure Hypervisor Approach to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/~casado/pcap/sectionl.html, (Jan. 6, 2014).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 11/717,475, filed Mar. 12, 2007 Final Office Action dated Feb. 27, 2013.
U.S. Appl. No. 11/717,475, filed Mar. 12, 2007 Final Office Action dated Nov. 22, 2010.
U.S. Appl. No. 11/717,475, filed Mar. 12, 2007 Non-Final Office Action dated Aug. 28, 2012.
U.S. Appl. No. 11/717,475, filed Mar. 12, 2007 Non-Final Office Action dated May 6, 2010.
U.S. Appl. No. 13/925,688, filed Jun. 24, 2013 Final Office Action dated Jan. 12, 2017.
U.S. Appl. No. 13/925,688, filed Jun. 24, 2013 Final Office Action dated Mar. 11, 2016.
U.S. Appl. No. 13/925,688, filed Jun. 24, 2013 Non-Final Office Action dated Jun. 2, 2015.
U.S. Appl. No. 13/925,688, filed Jun. 24, 2013 Non-Final Office Action dated Sep. 16, 2016.
U.S. Appl. No. 14/059,381, filed Oct. 21, 2013 Non-Final Office Action dated Oct. 29, 2014.
U.S. Appl. No. 14/229,541, filed Mar. 28, 2014 Non-Final Office Action dated Apr. 20, 2016.
U.S. Appl. No. 14/579,896, filed Dec. 22, 2014 Advisory Action dated Aug. 23, 2016.
U.S. Appl. No. 14/579,896, filed Dec. 22, 2014 Final Office Action dated Jul. 6, 2016.
U.S. Appl. No. 14/579,896, filed Dec. 22, 2014 Non-Final Office Action dated Mar. 22, 2016.
U.S. Appl. No. 14/579,896, filed Dec. 22, 2014 Non-Final Office Action dated Oct. 18, 2016.
U.S. Appl. No. 14/579,896, filed Dec. 22, 2014 Notice of Allowance dated Mar. 1, 2017.
U.S. Appl. No. 14/586,233, filed Dec. 30, 2014 Advisory Action dated Jun. 13, 2017.
U.S. Appl. No. 14/586,233, filed Dec. 30, 2014 Final Office Action dated Mar. 9, 2017.
U.S. Appl. No. 14/586,233, filed Dec. 30, 2014 Non-Final Office Action dated Aug. 24, 2016.
U.S. Appl. No. 14/620,060, filed Feb. 11, 2015, Non-Final Office Action dated Apr. 3, 2015.
U.S. Appl. No. 14/675,648, filed Mar. 31, 2015 Notice of Allowance dated Jul. 5, 2016.

(56) References Cited

OTHER PUBLICATIONS

U.S. Appl. No. 141739,921, filed Jun. 15, 2015 Final Office Action dated Dec. 26, 2017.
U.S. Appl. No. 141739,921, filed Jun. 15, 2015 Final Office Action dated Mar. 10, 2017.
U.S. Appl. No. 141739,921, filed Jun. 15, 2015 Non-Final Office Action dated Nov. 16, 2016.
U.S. Appl. No. 141739,921, filed Jun. 15, 2015 Non-Final Office Action dated Sep. 7, 2017.
U.S. Appl. No. 14/739,921, filed Jun. 15, 2015 Notice of Allowance dated May 29, 2018.
U.S. Appl. No. 15/339,459, filed Oct. 31, 2016 Non-Final Office Action dated Feb. 9, 2017.
U.S. Appl. No. 15/451,243, filed Mar. 6, 2017 Notice of Allowance dated Jul. 26, 2017.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Mathew M., "Throttling Virses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

VIRTUALIZED EXPLOIT DETECTION SYSTEM

CROSS-REFERENCE TO RELATED APPLICATIONS

This application is a continuation of U.S. application Ser. No. 14/739,921, filed on Jun. 15, 2015, now U.S. Pat. No. 10,148,693, issued Dec. 4, 2018, which claim priority benefit to U.S. Provisional Application No. 62/138,309, filed on Mar. 25, 2015, the entire contents of this application is incorporated by reference herein.

FIELD

Embodiments of the disclosure relate to the field of cyber security. More specifically, embodiments of the disclosure relate to a system for detecting anomalous, or more specifically, malicious behavior through successive intercommunications between virtual machines.

GENERAL BACKGROUND

Over the last decade, malicious software has become a pervasive problem for Internet users as many networked resources include vulnerabilities that are subject to attack. For instance, over the past few years, more and more vulnerabilities are being discovered in software that is loaded onto endpoint devices present on the network. These vulnerabilities may be exploited by allowing a third-party, e.g., through computer software, to gain access to one or more areas within the network not typically accessible. For example, a third-party may exploit a vulnerability to gain unauthorized access to email accounts and/or data files.

While some vulnerabilities continue to be addressed through software patches, prior to the release of such software patches, network devices will continue to be targeted for attack by exploits, namely malicious computer code that attempts to acquire sensitive information, adversely influence, or attack normal operations of the network device or the entire enterprise network by taking advantage of a vulnerability in computer software.

Currently, a datacenter may employ a plurality of virtual machines to simulate one or more endpoint devices in order to detect attacks by exploits and/or malware. However, the performance of advanced security measures on each virtual machine within the datacenter may lead to duplication of exploit detection efforts. This duplication of exploit detection efforts results in increased overhead of the plurality of virtual machines.

Currently, a virtual machine may perform a dynamic analysis of an object, e.g., one or more files included within received network traffic and/or files stored in a local or external storage device. In addition, each of a plurality of virtual machines may be configured with different software images thereby simulating various network device deployments. In some instances, a virtual machine may include a software configuration to simulate a specific network device within a particular enterprise network, e.g., configured with one or more specific applications to perform execution of particular objects.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
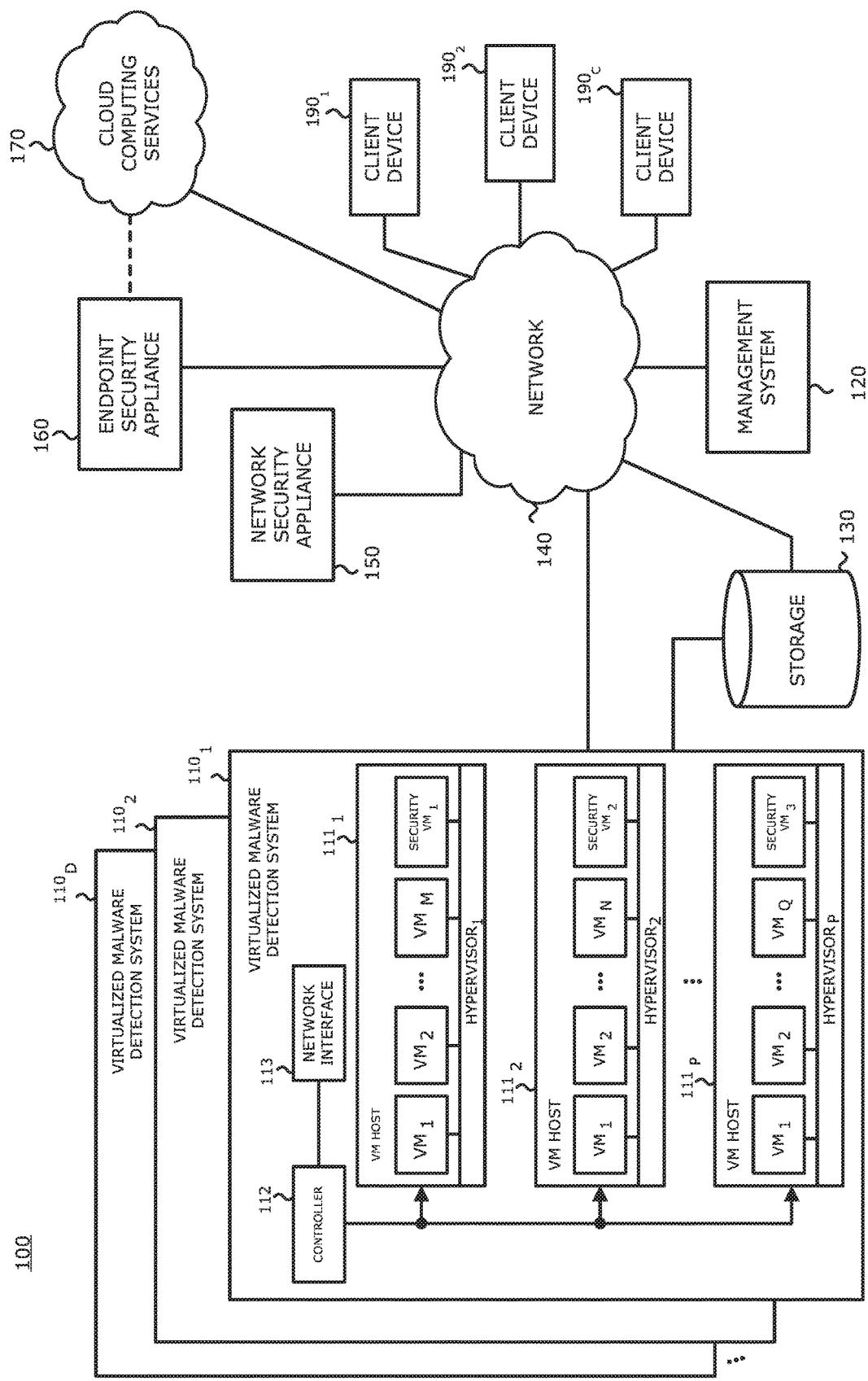
FIG. 1 is a block diagram of an exemplary virtualized malware detection system.

Various embodiments of the disclosure relate to a virtualized malware detection system that improves exploit detection and/or visual representation of the detection of the suspected exploit and/or malware. The virtualized malware detection system may include one or more virtual machine (VM) hosts, a controller, and optionally, a storage device. Each VM host may include one or more VMs, which perform dynamic analysis of an object, a "security" VM, which performs further analysis for each of the VMs within the VM host, and a hypervisor, which manages communications between the VMs and the security VM. It is contemplated that the security VM may be a secondary VM or another type of logic that runs in a virtual environment.

In one embodiment, the virtualized malware detection system may be deployed in a datacenter wherein the one or more VM hosts that include one or more VMs, a security VM and a hypervisor provide for savings on hardware costs. In one such embodiment, the VM hosts may be segmented (e.g., partitioned) according to enterprise and/or individual user (e.g., a solo entrepreneur) wherein each of the VMs and the security VM within a VM host are utilized by, for example, a single enterprise or solo entrepreneur. In a second embodiment, a datacenter deployment may include hardware comprising, at least, a first VM host including 500 VMs, a security VM and a hypervisor, and a second VM host including 1,000 VMs, a security VM and a hypervisor. In such an embodiment, a first enterprise may utilize the first VM including all 500 VMs and the security VM included therein, while a second enterprise may utilize the second VM including all 1,000 VMs and the security VM included therein.

In an alternative embodiment, the VMs within a VM host may be segmented according to enterprise and/or solo entrepreneur. For example, a datacenter deployment may include hardware comprising a VM host including 1,000 VMs, a security VM and a hypervisor. A first enterprise may utilize 900 VMs and a solo entrepreneur may utilize 100 VMs wherein all 1,000 VMs utilize the same security VM. The communication between the VMs and the security VM is coordinated by the hypervisor; therefore, data of the first enterprise and data of the entrepreneur will not be commingled.

In one embodiment of the disclosure, the virtualized malware detection system determines whether an object is associated with a malicious attack through a dynamic analysis of the object within a virtual run-time environment. The virtual run-time environment features one or more VMs, which may be provisioned with a guest image associated with a prescribed software profile. Each guest image may include a software application and/or an operating system (OS). The guest image may further include one or more monitors, namely software components that are configured to observe and capture run-time behavior of an object under analysis during processing within the virtual machine. In another embodiment, the virtualized malware detection system may perform pre-processing, which may include signature checks and/or comparisons of information associated with the object with content within the one or more entries of a blacklist and/or a whitelist. Herein, the term "signature" may designate an indicator of a set of characteristics and/or behaviors exhibited by one or more exploits that may not be unique to those exploit(s). Thus, a match of the signature may indicate to some level of probability that a portion of received data constitutes an exploit. Subsequently, depending on the results of the pre-processing, the virtualized malware detection system may conduct dynamic analysis of the object.

In one embodiment, each of the VMs within a VM host may be configured with a guest image to simulate a particular endpoint device which may be based on the specific needs of a corporation, for example. Specifically, each VM may be configured with different operating systems, different applications, different versions of a common operating system and/or different versions of a common application. In one embodiment, the virtualized malware detection system may receive an object via a network connection based on an action by a user. For example, a user may remotely control actions on a VM within the VM host such that the user may download an object from an Internet browsing application and launch the object. Upon the user launching the object remotely in the VM, the VM within the VM host performs an analysis to determine whether the object is associated with a malicious attack. Specifically, the VM may provide the security VM with information associated with the object in order to enable the security VM to perform pre-processing thereon. When the pre-processing does not result in a determination that the object is non-malicious (e.g., the object matches an entry on a whitelist), the VM continues a dynamic analysis of the object within the virtual run-time environment. Herein, the term "launch" (and other tenses) represents performance of one or more events that initiates activation of an object under analysis. When the VM detects the occurrence of a triggering event, the VM provides information associated with the triggering event to the security VM for further analysis. The triggering event may be an event that, through experiential knowledge and/or machine learning techniques, has been determined to have an association with a malicious attack but signifies further analysis should be performed.

In one embodiment, as the security VM is performing further analysis on the information associated with the triggering event, the VM continues the dynamic analysis. Furthermore, the VM may provide the security VM with post-processing information associated with the triggering event throughout the dynamic analysis. In a second embodiment, the VM may pause processing until the security VM requests additional information associated with processing of the object subsequent to the occurrence of the triggering event. Therefore, duplication of work performed on each of the VMs is avoided by off-loading the further analysis of information associated with the occurrence of a triggering event to a security VM.

Embodiments of the invention may be employed by or take the form of a server device or apparatus implementing a virtualized malware detection system, where the virtualized malware detection system includes a plurality of VM hosts, which each include a plurality of VMs and a security VM. According to one embodiment of the disclosure, an endpoint device, management system or cloud computing service transmits an object to the virtualized malware detection system for analysis, wherein a user remotely launches the object within a VM of the detection system $110_1$. Depending on the analysis by the virtualized malware detection system, the object may be labeled as either "non-malicious" or "malicious." Throughout the specification, claims and figures, the term "network traffic" will be used in the discussion but any form of incoming data may be substituted.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

An "exploit" may be construed broadly as information (e.g., executable code, data, command(s), etc.) that attempts to take advantage of a vulnerability in software and/or an action by a person gaining unauthorized access to one or more areas of a network, a computer and/or an electronic device. For instance, a "vulnerability" is a coding error or artifact of software (e.g., computer program) that allows an attacker to alter legitimate control flow during processing of the software (computer program) by a network device, and thus, causes the network device to experience undesirable or anomalous behaviors. The undesired or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. As an illustrative example, a computer program may be considered as a state machine, where all valid states (and transitions between states) are managed and defined by the program, in which case an exploit may be viewed as seeking to alter one or more of the states (or transitions) from those defined by the program. The term "anomalous behavior" should be understood to include either (i) a first event that is an atypical occurrence or a malicious occurrence, or (ii) a relationship identifying that the first event is based on a second event, the relationship being an atypical relationship between the first and second event or a relationship between the first and second events that is malicious to the network, electronic device on which the relationship appears, or to one or more users of the electronic device or of the network.

According to one embodiment, the term "malware" may be construed broadly as computer code that executes an exploit to take advantage of a vulnerability, for example, to harm or co-opt operation of a network device or misappropriate, modify or delete data. Conventionally, malware is often said to be designed with malicious intent.

The term "transmission medium" is a physical or logical communication path between two or more network devices (e.g., any devices with data processing and network connectivity such as, for example, a security appliance, a server, a mainframe, a computer such as a desktop or laptop, netbook, tablet, firewall, smart phone, router, switch, bridge, etc.). For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "object" generally refers to a collection of data, whether in transit (e.g., over a network) or at rest (e.g., stored), often having a logical structure or organization that enables it to be classified for purposes of analysis. During analysis, for example, the object may exhibit a set of expected characteristics and, during processing, a set of expected behaviors. The object may also exhibit a set of unexpected characteristics and a set of unexpected behaviors that may evidence an exploit and potentially allow the object to be classified as an exploit.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may include packets, frames, or cells.

As an illustrative example, an "object" may include a set of flows such as a sequence of transmissions in accordance with a particular communication protocol (e.g., Transmission Control Protocol (TCP), Hypertext Transfer Protocol (HTTP), etc.), or inter-process communications (e.g., Remote Procedure Call "RPC" or analogous processes, etc.). Similar, as another illustrative example, the object may be a self-contained element, where different types of such objects may include an executable file, non-executable file (such as a document or a dynamically link library), a Portable Document Format (PDF) file, a JavaScript file, Zip file, a Flash file, a document (for example, a Microsoft Office® document), an electronic mail (email), downloaded web page, an instant messaging element in accordance with Session Initiation Protocol (SIP) or another messaging protocol, or the like.

The terms "potentially suspicious," "suspicious" and "malicious" may each be represent a probability (or level of confidence) that the object is associated with a malicious attack. For instance, the probability may be based, at least in part, on (i) pattern matches; (ii) analyzed deviations in messaging practices set forth in applicable communication protocols e.g., HTTP, TCP, etc.); (iii) analyzed compliance with certain message formats established for the protocol (e.g., out-of-order commands); (iv) analyzed header or payload parameters to determine compliance, (v) attempts to communicate with external servers during dynamic processing, and/or (vi) attempts to access predetermined (e.g., secure) locations in memory during dynamic processing.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for displaying an interactive infection visualization detailing detection, verification and/or prioritization of malicious content. As this invention is susceptible to embodiments of many different forms, it is intended that the present disclosure is to be considered as an example of the principles of the invention and not intended to limit the invention to the specific embodiments shown and described.

II. Virtualized Malware Detection System

Referring to FIG. 1, a block diagram of a malware and/or exploit detection system 100 deploying a plurality of exemplary virtualized malware detection systems (referred to hereinafter as "detection systems") 110$_1$-110$_D$ (D≥1, e.g., D=3) communicatively coupled to a management system 120 via a network 140 is shown. The malware and/or exploit detection system 100 may be deployed within an enterprise network, where the detection system 110$_1$ is communicatively coupled for network connectivity, e.g., to communicate with one or more client devices 190$_1$-190$c$.

Additionally, the detection system 110$_1$ may be communicatively coupled to the management system 120 and one or more detection systems 110$_2$-110$_3$ via the network 140. In general, the management system 120 may be adapted to manage detection systems 110$_1$-110$_3$, in part, through propagation of updates of, for example, a whitelist, a blacklist, correlation rules, guest images for the VMs, and/or VM hosts. For example, updates may include, but are not limited or restricted to, modifying a current entry in the whitelist or the blacklist, modifying a current correlation rule, adding a new entry to the whitelist or the blacklist, adding a new correlation rule, removing a current entry in the whitelist or the blacklist, and/or removing a current correlation rule. Also, the detection system 110$_1$ may be communicatively coupled to a network security appliance 150 and/or an endpoint security appliance 160. The coupling to the network security appliance 150 and/or the endpoint security appliance 160 may be through a wired connection or via a wireless network, such as the network 140. In addition, the detection system $110_1$ may be communicatively coupled, e.g., indirectly via the endpoint security appliance 160, to the cloud services 170. Finally, the detection system $110_1$ may be communicatively coupled to a storage device 130.

As further shown in FIG. 1, the detection system $110_1$ may include one or more VM hosts $111_1$-$111_P$ (P≥1) and a controller 112. The VM host $111_1$ may include one or more VMs, a security VM, and a hypervisor. In a first embodiment, the VM host $111_1$ may be a hardware appliance hosting several VMs wherein the VM host $111_1$ may receive instructions, commands and/or updates via the controller 112. According to this embodiment, the VM hosts $111_1$-$111_P$ may reside in a single location on the same hardware (e.g., an enterprise server). In a second embodiment, the VM hosts $111_1$-$111_P$ may reside on separate hardware devices wherein each VM host $111_1$-$111_P$ is communicatively coupled to the controller 112. In the second embodiment, the separate hardware devices housing one or more VM hosts $111_1$-$111_P$ may be located at a central location (e.g., a datacenter) or located at various remote locations and communicatively coupled to the controller 112 and the storage 130 (e.g., via a network). The storage 130 may include storage space (e.g., a non-transitory storage medium) for each of the VMs included in the detection system $110_1$.

As will be discussed in detail below, each $VM_i$ (1≤i≤M, wherein M=3 for this example) deploying as part of the VM host $111_1$ may model a separate endpoint device (e.g., acting as a virtual representation of the endpoint device including running a specified operating system and one or more specified applications). Alternatively, one or more VMs (e.g., $VM_1$-$VM_M$) of the VM host $111_1$ may model a single endpoint device wherein various versions of operating systems and/or applications are run according to configurations of the endpoint device. For example, $VM_1$ of the VM host $111_1$ may run the Microsoft® Windows® 8.1 operating system and Adobe® Acrobat® version 10.0 while $VM_2$ of the VM host $111_1$ may run the Microsoft® Windows® 8.1 operating system and Adobe® Acrobat® version 11.0 in order to simulate the endpoint devices as needed by, for example, a corporation utilizing the detection system $110_1$. Additionally, the use of various configurations may also aid in determining the whether malware and/or exploits are triggered in a specified version of an application.

The security $VM_i$ of the VM host $111_1$ serves as a VM dedicated to providing further analysis of an object identified in one or more of the $VM_1$-$VM_M$ as being "potentially suspicious." As will be discussed below, each of the $VM_1$-$VM_M$ implemented within the VM host $111_1$ provides a virtualized run-time environment in which to execute an object. The detection system $110_1$ also enables a determination as to whether one or more triggering events (e.g., events that signify the object may be suspicious and/or malicious) are detected during the execution of the object. Once a triggering event is detected by at least one VM of $VM_1$-$VM_M$ (for this example, $VM_1$ will be used), the object is determined to be "potentially suspicious," and information associated with the object and the detected event is transmitted to the security $VM_1$ of the VM host $111_1$ wherein further analysis is done to determine whether the object is "suspicious." If the security $VM_1$ determines the object is suspicious, a request for further information associated with the detected event is transmitted to the $VM_1$. Subsequently, the $VM_1$ may provide the security $VM_1$ with information associated with the event and information associated with the object, wherein the information provided is based on processing conducted subsequent to the detection of the event (e.g., information detailing one or more of changes to Registry files, the operating system and/or configuration files, attempts to access locations in memory, generated files, etc.). The security $VM_1$ performs subsequent analysis based on one or more portions of information received from the $VM_1$ and determines whether the object is malicious.

The $hypervisor_1$ included in the VM host $111_1$ manages communications between $VM_1$-$VM_M$ and the security $VM_1$. In addition, the $hypervisor_1$ may include logic to manage communications between the $VM_1$-$VM_M$ and the security $VM_1$ as well as data storage.

In a first embodiment, each of the VMs within the VM hosts $111_1$-$111_P$ correspond to endpoint devices within a separate enterprise network. For example, each of $VM_1$-$VM_M$ deployed within the VM host $111_1$ may correspond to endpoint devices within an enterprise network of a first company and each of $VM_1$-$VM_N$ deployed within the VM host $111_2$ may correspond to endpoint devices within an enterprise network of a second company. In a second embodiment, each $VM_1$-$VM_Q$ of the VM host $111_P$ may correspond to endpoint devices of a plurality of enterprise networks of a plurality of companies. For example, $VM_1$ and $VM_2$ of the VM host $111_P$ may correspond to endpoint devices of an enterprise network of a first company and the $VM_3$ and the $VM_Q$ of the VM host $111_P$ may correspond to endpoint devices of an enterprise network of a second company.

A. Virtual Machine Host Component

Figure 2:
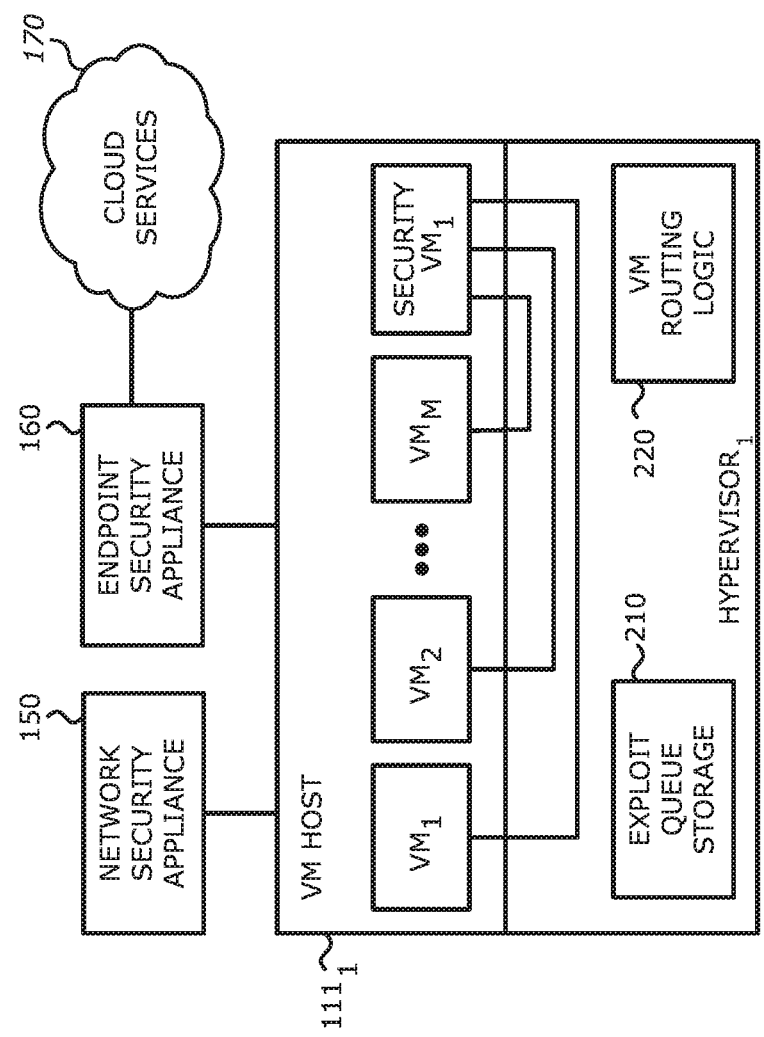
FIG. 2 is a block diagram of an exemplary virtual machine host of a virtualized malware detection system communicatively coupled to a network security appliance, an endpoint security appliance and cloud services.

Referring now to FIG. 2, a block diagram of an exemplary the virtual machine (VM) host $111_1$ of the virtualized malware detection system $110_1$ that is communicatively coupled to a network security appliance 150, an endpoint security appliance 160 and cloud services 170 is shown. In particular, FIG. 2 provides a detailed illustration of the interactions within the VM host $111_1$. As shown, the each of $VM_1$-$VM_M$ communicates with the security $VM_1$ using the $hypervisor_1$ included in the VM host $111_1$. In addition, FIG. 2 illustrates the $hypervisor_1$ may include an exploit queue storage 210 and a VM routing logic 220.

The exploit queue storage 210 may store triggering events detected by one or more of $VM_1$-$VM_M$ for example in a queue format, until the security $VM_1$ is available for processing. In one embodiment, the security $VM_1$ may be performing analysis on information received from the $VM_1$ when the $VM_2$ detects a triggering event during processing. In such a situation, the exploit queue storage 210 may store the information associated with the object being processed and the triggering event detected by the $VM_2$ until the security $VM_1$ is available (e.g., has finished processing the information provided by the $VM_1$ and/or information in the queue ahead of the information provided by the $VM_2$).

Included in the $hypervisor_1$, the VM routing logic 220 may include logic to determine what information in the queue to provide to the security $VM_1$ as well as control communications from the security $VM_1$ to each of $VM_1$-$VM_M$. In addition, the VM routing logic 220 may maintain, e.g., via a table stored in the exploit queue storage 210, information such as (i) the VM from which information was provided and/or (ii) the process identification (ID) of the process in which the triggering event was detected.

Figure 3:
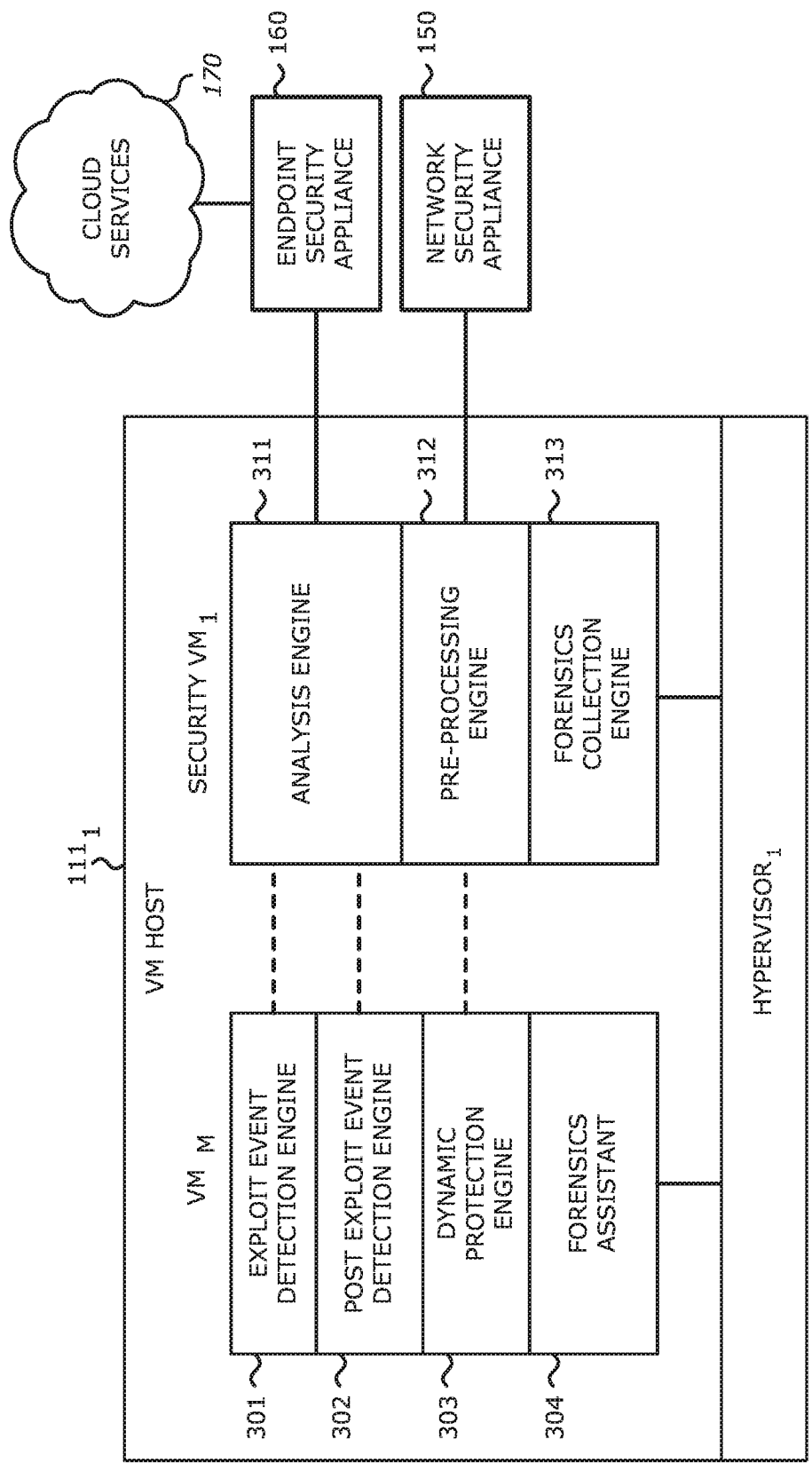
FIG. 3 is an in-depth block diagram of an exemplary virtual machine host of a virtualized malware detection system communicatively coupled to a network security appliance, an endpoint security appliance and cloud services.

Now referring to FIG. 3, an in-depth block diagram of a portion of the VM host $111_1$ of the detection system $110_1$ communicatively coupled to a network security appliance 150, an endpoint security appliance 160 and cloud services 170 is shown. The portion of the VM host $111_1$ that is illustrated includes the $VM_M$, the security $VM_1$ and the hypervisor$_1$. Of course, as illustrated previously, the VM host $111_1$ may include a plurality of VMs as seen in FIG. 1.

As illustrated, the $VM_M$ includes an exploit event detection engine 301, a post-exploit event detection engine 302, a dynamic protection engine 303 and a forensics assistant 304. The exploit event detection engine 301 monitors the processing of the object within the $VM_M$ in order to detect an occurrence of a triggering event. Upon detecting the triggering event, the exploit event detection engine 301 collects information associated with the detected triggering event as well as information of the object. Examples of the collected information may include, but is not limited or restricted to, a type of triggering event, the application processing the object that caused the triggering event (e.g., application name and/or version number), input to an application that triggered the event (e.g., simulated user input and/or a document that was used as input), the operating system name and version, etc. The collected information is then provided to the security $VM_1$ for further analysis. Following the detection of an occurrence of the triggering event, the post-exploit event detection engine 302 monitors the processing of the object with the $VM_M$.

The collection of triggering events may be pre-defined and pre-stored, e.g., in the storage 130. Alternatively, although not illustrated, the triggering events may be pre-stored in a storage device located within the detection system $110_1$, in the VM host $111_1$, or in each of the $VM_1$-$VM_M$. The collection of triggering events may be updated via the management system 120 (e.g., due to one or more detections of an exploit and/or malware by detection systems $110_2$—detection systems $110_3$). Additionally, the collection of triggering events may be updated by the network security appliance 150, the endpoint security appliance 160 and/or the cloud services 170, wherein such an update may be facilitated by the security $VM_M$.

Upon detection of a triggering event, the post-exploit event detection engine 302 monitors the processing of the object in the $VM_M$. In contrast, the exploit detection engine 301 monitors the processing prior to detection of a triggering event. Specifically, the monitoring conducted by the post-exploit event detection engine 302 is to detect any changes made to the environment within the $VM_M$ (e.g., change in Registry files, attempted changes to the operating system, etc.) and/or actions performed as a result of the triggering event (e.g., a successful or unsuccessful attempt to delete a file/directory, create a file/directory, establish communication with an external server, password protect a file/directory, encrypt a file/directory, etc.). Upon request, the post-exploit event detection engine 302 provides the security $VM_1$ with the collected information associated with the actions and changes subsequent to the detection of the occurrence of the triggering event.

The dynamic protection engine 303 determines identifying information of the object (e.g., URL, file name of the object, name of attachment in which the object was received email address of the sender of the object, etc.) and provides the initial identifying information to a pre-processing engine 312 implemented within the security $VM_1$ as described below. Upon analysis by the pre-processing engine 312, to be discussed below, the dynamic protection engine 303 receives a notification from the pre-processing engine 312 based on the analysis. Based on the notification from the pre-processing engine 312, the dynamic protection engine 303 may allow the $VM_M$ to continue processing or stop processing of the object based on a determination as to whether the object is malicious or non-malicious. Additionally, the dynamic protection engine 303 may save the state information of the $VM_M$ when a triggering event is detected (hereinafter referred to as "taking a snapshot"). Subsequently, once processing of the object has been completed and/or the object has been identified as malicious or non-malicious, the dynamic protection engine 303 may revert the $VM_M$ back to the state captured in the snapshot.

The forensics assistant 304 collects state information of the $VM_M$ upon the detection of the occurrence of a triggering event. Examples of information collected by the forensics assistant 304 include, but are not limited or restricted to, registry key, registry values, metadata of specific storage locations (e.g., files and/or folders that may be interacted with during processing of an object), a disk image (e.g., a snapshot of a storage device), network activity occurring during processing of an object and/or requests of user interaction occurring during processing of an object.

The security $VM_1$ includes an analysis engine 311, the pre-processing engine 312 and a forensics collection engine 313. The analysis engine 311 receives information associated with a triggering event and the object being processed from the $VM_M$. Specifically, the analysis engine 311 receives information associated with the triggering event and information associated with the object being processed from the exploit event detection engine 301 as discussed above. The analysis engine 311 performs an analysis on the information received from the exploit event detection engine 301 to determine whether the object being processed in "suspicious." The analysis performed by the analysis engine 311 is based on one or more correlation rules. The correlation rules provide a basis to determine whether the object is suspicious by assessing whether the information associated with the detected triggering event and the object being processed results in a rule violation.

For example, one correlation rule may state a prohibition of a particular application writing to a predetermined storage location without permission. A violation of the correlation rule would occur when the particular application attempts to write data to the predetermined storage without permission (whether the write attempt was successful or unsuccessful). Additional correlation rules may relate to occurrences of anomalous behaviors and may be defined for particular applications and/or may be defined for all applications. Additional examples of correlation rules may include, but are not limited or restricted to, a prohibition on copying data stored in a predetermined storage location, a prohibition on deleting data stored in a predetermined storage location, a prohibition on creating a file in a predetermined location in a file system, a prohibition on encrypting data in a predetermined storage location, or the like.

The analysis engine 311 may include a single set of correlation rules that are applied to all information associated with a detected triggering event. Alternatively, the analysis engine 311 may include multiple sets of correlation rules wherein intelligence (e.g., a filtering mechanism) may determine one or more sets of correlation rules to apply to the received information. For example, one or more sets of correlation rules may be applied based on, among other features, the detected triggering event, the operating system of the $VM_M$ and/or the application/process that triggered the occurrence of the triggering event.

When the analysis based on the correlation rules results in a determination that the object is "suspicious," the analysis engine 311 requests, from the post-exploit event detection engine 302 of the $VM_M$, additional information pertaining to any changes to and/or actions taken within the environment of the $VM_M$. Based upon the received additional information provided by the post-exploit event detection engine 302, the analysis engine 311 performs further analysis based on correlation rules (e.g., the same as above, a separate set of correlation rules, or a combination) to determine whether the suspicious object is malicious. In one embodiment, the correlation rules may be applied to both the initial information provided by the exploit event detection engine 301 as well as the additional information provided by the post-exploit event detection engine 302. As discussed above, a single set of correlation rules may be applied to the additional information (and optionally the initial information) or one or more sets of correlation rules may be applied based on intelligence in the analysis engine 311. Based on the analysis of at least the additional information provided by the post-exploit event detection engine 302, the analysis engine 311 may determine that the object is "malicious."

Figure 4A:
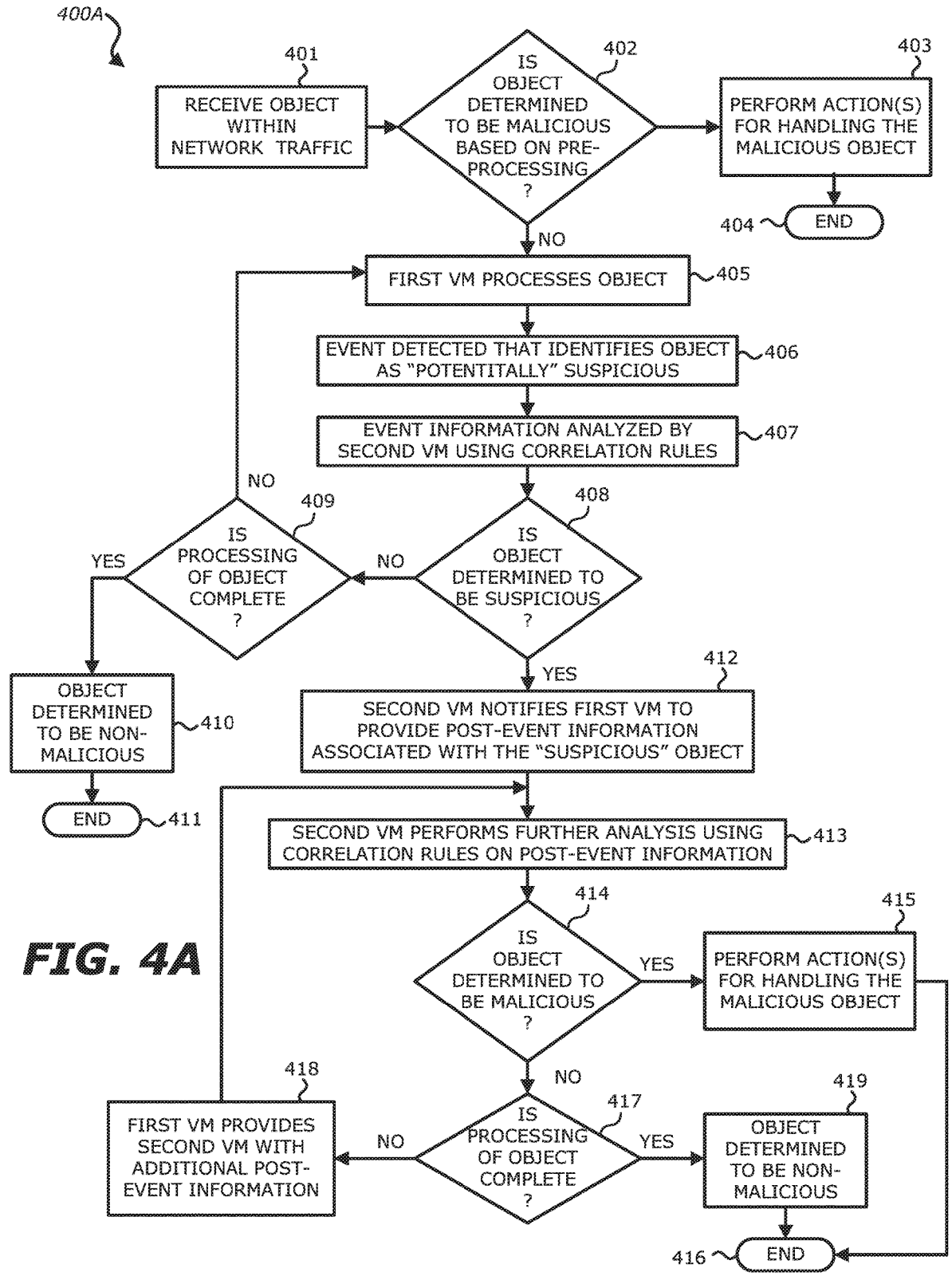
FIG. 4A is a flowchart illustrating a first exemplary method of detecting malware and/or exploits using a virtualized malware detection system.
Figure 4B:
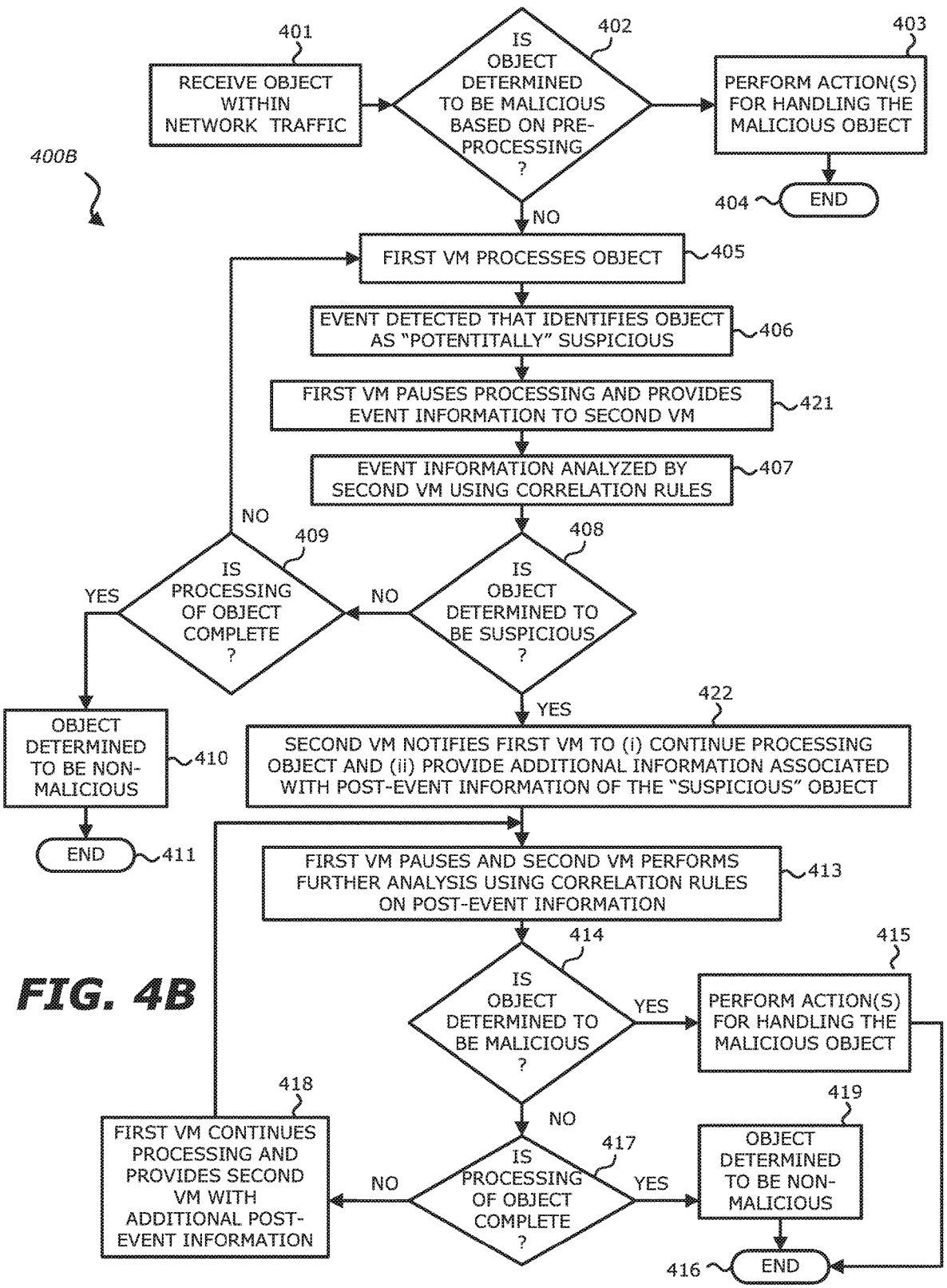
FIG. 4B is a flowchart illustrating a second exemplary method of detecting malware and/or exploits using a virtualized malware detection system.

Furthermore, the analysis of the additional information may occur repeatedly when an analysis of the additional information does not initially result in a determination that the object is malicious. When the analysis of the additional information does not result in a determination that the object is malicious and when the processing of the object in the $VM_M$ is not yet complete, the analysis engine 311 may requests more additional information (e.g., information pertaining to changes to and/or actions taken within the environment of the $VM_M$ since the first set of additional information was provided). The reoccurring process is illustrated in FIGS. 4A and 4B and will be discussed below.

The pre-processing engine 312 receives identifying information from the dynamic protection engine 303 and performs an analysis to determine whether the identifying information of the object matches an entry on either a whitelist or a blacklist. When the identifying information of the object matches an entry on the blacklist (e.g., signifying that the object has previously been determined to be malicious), the pre-processing engine 312 may (i) notify the dynamic protection engine 303 that processing of the object should cease as the object is malicious, or (ii) notify the dynamic protection engine 303 of the match between the identifying information of the object and an entry on the blacklist but that processing in the $VM_M$ should continue in order to determine and/or verify any malicious effects as a result of processing the object.

When the identifying information of the object matches an entry on the whitelist (e.g., signifying that the object has previously been determined to be non-malicious), the pre-processing engine 312 may (i) notify the dynamic protection engine 303 that processing of the object should cease as the object is non-malicious, or (ii) notify the dynamic protection engine 303 of the match between the identifying information of the object and an entry on the whitelist but that processing in the $VM_M$ should continue in order to verify the object is non-malicious based on updated correlation rules and/or other information collected/generated since the object was placed on the whitelist. When the object does not appear on either a whitelist or a blacklist, the dynamic protection engine 303 is notified to continue processing so that a determination of malicious/non-malicious can be made.

As is illustrated in FIG. 3, the analysis engine 311 is communicatively coupled to the endpoint security appliance 160 and the cloud services 170. The result of the analysis performed by the analysis engine 311 may be supplied to the endpoint security appliance 160 for the purpose of alerting a user, network administrator and/or expert network analyst and/or enabling a user, network administrator and/or expert network analyst to view the results. Examples of information that may be displayed for viewing include, but are not limited or restricted to, one or more of (i) how the object entered the network, (ii) which application(s) triggered the occurrence of the triggering event and/or (iii) any malicious effects from the processing of the object. Additionally, the object may be processed by the endpoint security appliance 160 using a two-step analysis of a static analysis and a dynamic analysis. An illustrative example of the two-step analysis including a static analysis and a dynamic analysis may be found in in a prior U.S. Patent Application entitled "Dynamically Remote Tuning of Malware Content Detection System," U.S. patent application Ser. No. 14/231,216 filed Mar. 31, 2014, the contents of which are incorporated by reference. Furthermore, the results of the analysis engine 311 may be uploaded to the cloud services 170 for future reference by the detection systems $110_{1-3}$ and/or client devices.

As is further illustrated, the pre-processing engine 312 is communicatively coupled to the network security appliance 150. The result of the analysis performed by the pre-processing engine 312 may be supplied to the network security appliance 150 for the purpose of alerting a user, network administrator and/or expert network analyst and/or enabling a user, network administrator and/or expert network analyst to view the results. The viewing may include, among other things, the whitelist/blacklist on which the object appears as well as information associated with the object collected during analysis and/or processing. Additionally, the object may be processed by the network security appliance 170 using a two-step analysis of a static analysis and a dynamic analysis.

The forensics collection engine 313 collects and analyzes the information (e.g., forensics data) collected by the forensics assistants 304 of each $VM_1$-$VM_M$ within the VM Host $111_1$. The forensics collection engine 313 may collect the information from the forensics assistants 304 at (i) scheduled intervals and/or (ii) upon detection of a triggering event. The forensics collection engine 313 may be configured to query the forensics assistants 304 of each $VM_1$-$VM_M$ at scheduled intervals. Additionally, or in the alternative, forensics collection engine 313 may be configured to query the forensics assistants 304 of the $VM_M$ in which a triggering event was detected upon the detection.

Upon receiving a response to one or more queries, the forensics collection engine 313 correlates the collected information against a predetermined rule set (e.g., one or more rules that may recite expected behavior by an object and/or application, and/or one or more rules that may recite anomalous behavior by an object and/or application). The rule set may identify abnormalities of the processing environment of the $VM_M$. For example, the correlation may identify deviations from expected behaviors of an object of a particular object-type or application as a result of processing an object. In one embodiment, one or more of the deviations identified by the rule set may not rise to a suspicious level of a triggering event; however, the forensics collection engine 313 may determine one or more rules of the rule set that were violated, and therefore an alert to, for example, the endpoint security appliance 160 for further processing may be provided by the security VM. Alternatively, one or more rules of the rule set may have different weightings that are used in determining whether an alert should be issued. Furthermore, the detection system $110_1$ may also provide alerts to the user remotely controlling the $VM_M$ from which the information violating the one or more rules of a rule set was collected, a network administration and/or an expert malware analyst. The correlation results and/or information collected by the forensics collection engine 313 may be stored in the storage 130, for example.

Similarly, the forensics collection engine of the security $VM_2$ collects and analyzes the information collected by the forensics assistants of each $VM_1$-$VM_N$ within the VM Host $111_2$ while the forensics collection engine of the security $VM_3$ collects and analyzes the information collected by the forensics assistants of each $VM_1$-$VM_Q$ within the VM Host $111_P$.

B. Exemplary Flow of a Virtualized Malware Detection System

Referring to FIGS. 4A and 4B, flowcharts illustrating an exemplary method for detecting malware and/or exploits using the detection system $110_1$ are shown. Referring to FIG. 4A, a flowchart illustrating a first exemplary method of detecting malware and/or exploits using detection system $110_1$ is shown. Each block illustrated in FIG. 4A represents an operation performed in the method 400A of detecting malware and/or exploits based on the use of detection system $110_1$ wherein the first VM (e.g., the $VM_M$ as described above) and the second VM (e.g., the security $VM_1$ as described above) process the object concurrently (at least partially overlapping at the same time).

At block 401, an object is received within network traffic and at block 402, the object undergoes pre-processing to determine whether the object is malicious. In this embodiment, the pre-processing may include a comparison of information identifying the object with an entry on a whitelist and/or a blacklist. A match between the identifying information of the object and an entry on the blacklist may signify the object is malicious. When the object is determined to be malicious based on pre-processing (yes at block 402), actions are performed to handle the malicious object (block 403). Examples of actions performed to handle a malicious object include, but are not limited or restricted to, (i) generating an alert to notify a user, (ii) a network administrator and/or an expert network analyst, uploading information associated with the malicious object to the cloud services and/or (iii) preventing the object from being received and/or processed by a client device, if possible.

When pre-processing does not result in a determination that the object is malicious (no at block 402), the first VM launches the object and begins processing (block 405). At block 406, at least one of a set of triggering events is detected that identifies the object as being "potentially suspicious." When an object is identified as being potentially suspicious, information associated with the object and information associated with the detected triggering event are provided to the second VM for analysis based on one or more correlation rules (block 407). Based on the analysis performed in block 407, a determination is based as to whether the object is suspicious (block 408). When the object is not determined to be suspicious (no at block 408), a determination is made as to whether the processing of the object is complete (e.g., the determination may be made by either the exploit event detection engine 301 or the post-exploit event detection engine 302) (block 409). When the processing of the object is not complete (no at block 409), the first VM continues processing the object while monitoring the processing for the occurrence of at least one or a predefined set of triggering event. When the processing of the object is complete (yes at block 409), the object is determined to be non-malicious (block 410), as no triggering event that led to a determination the object was suspicious was detected.

When the object is determined to be suspicious (yes at block 408), the second VM requests information associated with the post-event processing of the suspicious object from the first VM (block 412). In one embodiment, the first VM continues to process the object upon detection of the occurrence of the triggering event (e.g., the processing of the first VM and the analysis by the second VM occur concurrently). Therefore, when the second VM requests information associated with the post-event processing, the first VM supplies the information associated with the post-event processing without having to first continue processing of the object.

The second VM performs further analysis of the information associated with the post-event processing (and, optionally, the information pertaining to the triggering event) based on correlation rules (block 413). Following the further analysis by the second VM, a determination as to whether the object is malicious is made (block 414). When the object is determined to be malicious (yes at block 414), actions for handling the malicious object, as discussed above, are performed (block 415).

When the object is not determined to be malicious (no at block 414), a determination is made as to whether the processing of the object is complete (block 417). When the processing is complete (yes at block 417), the object is determined to be non-malicious (block 419). Additionally, as described above, the results of the analyses performed by the first VM and/or the second VM may be provided to a user, a network administrator and/or an export network analyst via one or more security appliances.

When the processing of the object is not complete (not at block 417), the first VM provides the second VM with additional information associated with the post-event processing (e.g., information associated with post-event processing since the second VM was previously provided with information associated with the post-event processing) (block 418) and the method 400A returns to block 413.

Referring to FIG. 4B, a flowchart illustrating a second exemplary method of detecting malware and/or exploits using the detection system $110_1$ is shown. Each block illustrated in FIG. 4B represents an operation performed in the method 400B of detecting malware and/or exploits based on the use of the detection system $110_1$ wherein the first VM and the second VM do not process the object concurrently.

At block 401, an object is received within network traffic and at block 402, the object undergoes pre-processing to determine whether the object is malicious. In this embodiment, the pre-processing may include a comparison of information identifying the object with an entry on a whitelist and/or a blacklist. A match between the identifying information of the object and an entry on the blacklist may signify the object is malicious. When the object is determined to be malicious based on pre-processing (yes at block 402), actions are performed to handle the malicious object (block 403). Examples of actions performed to handle a malicious object include, but are not limited or restricted to, (i) generating an alert to notify a user, (ii) a network administrator and/or an expert network analyst, uploading information associated with the malicious object to the cloud services and/or (iii) preventing the object from being received and/or processed by a client device, if possible.

When pre-processing does not result in a determination that the object is malicious (no at block 402), the first VM launches the object and begins processing the object (block 405). At block 406, at least one of a set of triggering events is detected that identifies the object as being "potentially suspicious." In one embodiment, when an object is identified as being potentially suspicious, the first VM pauses processing and provides information associated with the object and the detected triggering event is provided to the second VM for analysis based on correlation rules (block 421). The second VM performs an analysis of the event information using correlation rules at block 407. Based on the analysis performed in block 407, a determination is based as to whether the object is suspicious (block 408). When the object is not determined to be suspicious at block 408, a determination is made as to whether the processing of the object is complete (e.g., the determination may be made by either the exploit event detection engine 301 or the post-exploit event detection engine 302) (block 409). When the processing of the object is not complete (no at block 409), the first VM continues processing the object, monitoring the processing for the occurrence of a triggering event. When the processing of the object is complete (yes at block 409), the object is determined to be non-malicious (block 410) as no triggering event that led to a determination the object was even suspicious was detected. Subsequently, the process may end at block 411.

When pre-processing does not result in a determination that the object is malicious (no at block 402), the first VM launches the object and begins processing (block 405). At block 406, at least one of a set of triggering events is detected that identifies the object as being "potentially suspicious." When an object is identified as being potentially suspicious, the first VM pauses processing and provides information associated with the object and the detected triggering event is provided to the second VM for analysis based on correlation rules (block 421). The second VM performs an analysis of the event information using correlation rules at block 407. Based on the analysis performed in block 407, a determination is based as to whether the object is suspicious (block 408). When the object is not determined to be suspicious at block 408, a determination is made as to whether the processing of the object is complete (e.g., the determination may be made by either the exploit event detection engine 301 or the post-exploit event detection engine 302) (block 409). When the processing of the object is not complete (no at block 409), the first VM continues processing the object while monitoring the processing for the occurrence of at least one of a predefined set of triggering event. When the processing of the object is complete (yes at block 409), the object is determined to be non-malicious (block 410), as no triggering event that led to a determination the object was suspicious was detected.

When the object is determined to be suspicious (yes at block 408), the second VM notifies the first VM to (i) continue processing the object and (ii) provide information associated with the post-event processing of the suspicious object (block 422). In one embodiment, the first VM continues to process the object upon detection of the triggering event (e.g., the processing of the first VM and the analysis by the second VM occur concurrently). Therefore, when the second VM requests information associated with the post-event processing, the first VM supplies the information associated with the post-event processing without having to first continue processing of the object.

The first VM pauses processing and the second VM performs further analysis of the information associated with the post-event processing (and, optionally, the information pertaining to the triggering event) based on correlation rules (block 413). Following the further analysis by the second VM, a determination as to whether the object is malicious is made (block 414). When the object is determined to be malicious (yes at block 414), actions for handling the malicious object are performed, as discussed above (block 415).

When the object is not determined to be malicious (no at block 414), a determination is made as to whether the processing of the object is complete (block 417). When the processing is complete (yes at block 417), the object is determined to be non-malicious (block 419). Additionally, as described above, the results of the analyses performed by the first VM and/or the second VM may be provided to a user, a network administrator and/or an export network analyst via one or more security appliances.

When the processing of the object is not complete (not at block 417), the first VM continues processing and subsequently provides the second VM with additional information associated with the post-event processing (block 418) and the method 400B returns to block 413.

Figure 5A:
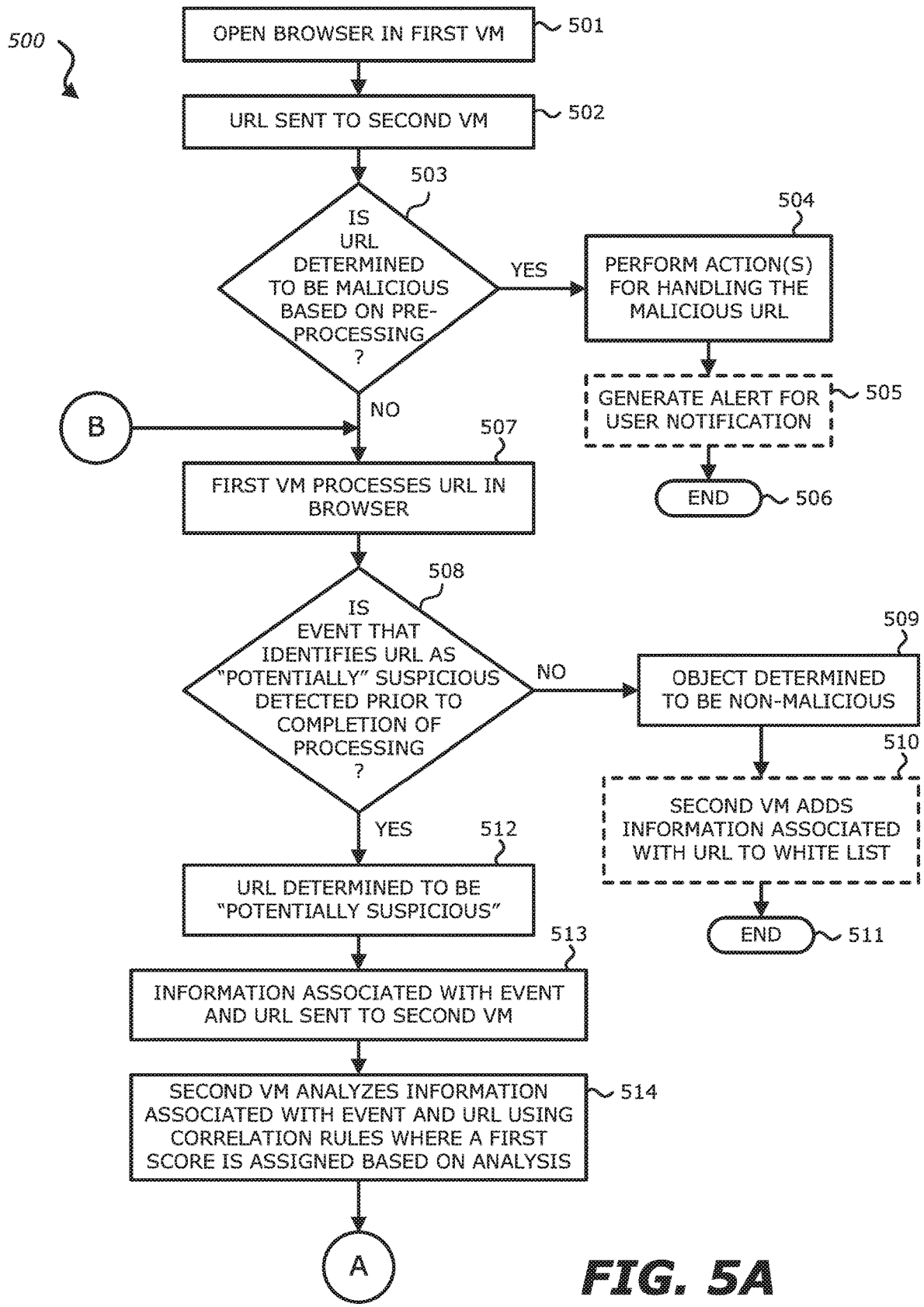
FIGS. 5A and 5B are flowcharts illustrating an exemplary method for detecting malware and/or exploits associated with a uniform resource locator (URL) opened within a browser using a virtualized malware detection system.
Figure 5B:
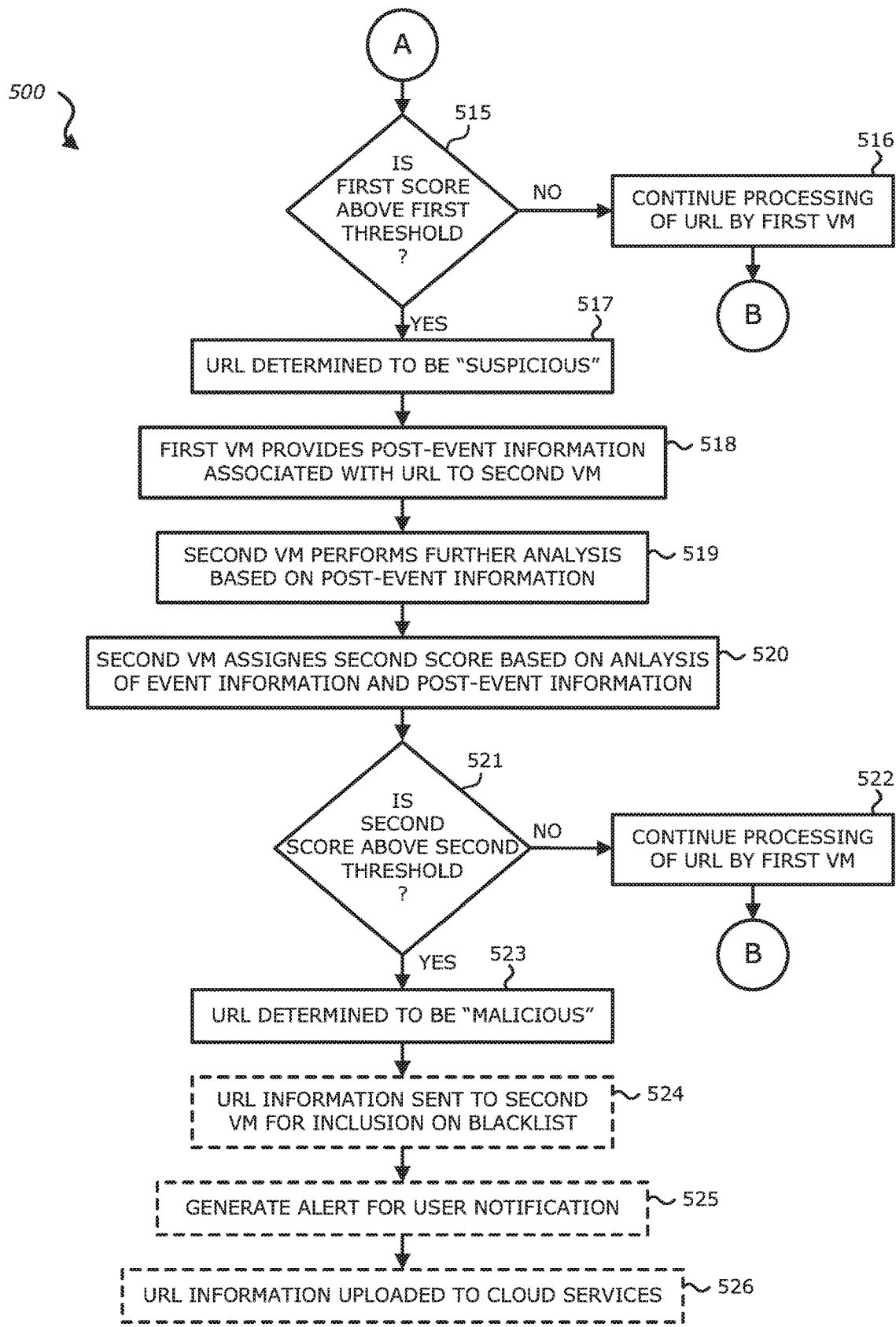

Referring to FIGS. 5A and 5B, flowcharts illustrating an exemplary method for detecting malware and/or exploits associated with a URL opened within a browser using the detection system $110_1$ are shown. Each block illustrated in FIGS. 5A and 5B represents an operation performed in the method 500 of detecting malware and/or exploits based on the use of the detection system $110_1$ wherein a URL is processed in a browser application. Referring to FIG. 5A, at block 501, a URL is opened in a browser application within a first VM. At block 502, information identifying the URL, in this example, the URL itself, is sent to the second VM for pre-processing to determine whether the URL matches an entry on a blacklist or a whitelist. When the URL is determined to be malicious, e.g., matches an entry on a blacklist (yes at block 503), actions to handle the malicious URL are performed at block 504. Examples of actions to handle the malicious URL include, but are not limited or restricted to, (i) generating an alert to notify a user, (ii) a network administrator and/or an expert network analyst uploading information associated with the malicious object to the cloud services and/or (iii) preventing the object from being received and/or processed by a client device, if possible. In one embodiment, an alert for user notification may be generated at block 505.

When the URL is not determined to be malicious (no at block 503), the first VM processes the URL in the browser application (block 507). At block 508, a determination is made as to whether a triggering event that identifies the URL as "potentially suspicious" has been detected prior to the completion of the processing of the URL. When a triggering event has not been detected (no at block 508), the URL is determined to be non-malicious at block 509. At optional block 510, the second VM may add information associated with the non-malicious URL to a whitelist for future reference and the process may subsequently end at block 511.

When a triggering event has been detected (yes at block 508), the URL is determined to be "potentially suspicious," at block 512 and information associated with the detected triggering event and the information associated with the URL are provided to the second VM at block 513. At block 514, the second VM analyzes the information associated with the detected triggering event and the information associated with the URL using one or more correlation rules wherein a first score is assigned to the URL based on the analysis.

The method 500 continues in FIG. 5B at block 515 wherein a determination is made as to whether the first score is above a first threshold. When the first score is not above the first threshold (no at block 515), the first VM continues processing the URL in the browser application (block 516) and the method 500 returns to block 507.

When the first score is determined to be above the first threshold (yes at block 515), the URL is determined to be "suspicious" (block 517). At block 518, the first VM provides the second VM with information associated with the post-event processing associated with the URL (e.g., changes to or actions conducted within the virtual run-time environment of the first VM since the triggering event was detected). At block 519, the second VM performs further analysis on, at least, the information associated with the post-event processing (may optionally include the information associated with the triggering event and the information associated with the URL) based on one or more correlation rules, which may be the same as the correlation rules used above in association with block 514, may be separate correlation rules, or may be a combination thereof. At block 520, a second score is assigned to the URL based on the processing of, at least, the information associated with the post-event processing. A determination is made as to whether the second score exceeds a second threshold at block 521. When the second score is not above the second threshold (no at block 521), the first VM continues processing the URL in the browser application (block 522) and the method 500 returns to block 507.

When the second score is determined to be above the second threshold (yes at block 521), the URL is determined to be "malicious" (block 523). Actions may then be taken to handle the malicious URL. For example, (i) at optional block 524, the information associated with the URL (e.g., identifying information, metadata, information signifying how the URL was received by the detection system $110_1$, etc.) may be provided to the second VM for inclusion on a blacklist, (ii) at optional block 525, an alert may be generated for user notification (in one embodiment, using an endpoint security appliance 160 and/or a network security appliance 150), and/or (iii) at optional block 526, the information associated with the URL may be uploaded to cloud services 170 for reference by one or more other detection systems and/or by one or more client devices.

Figure 6:
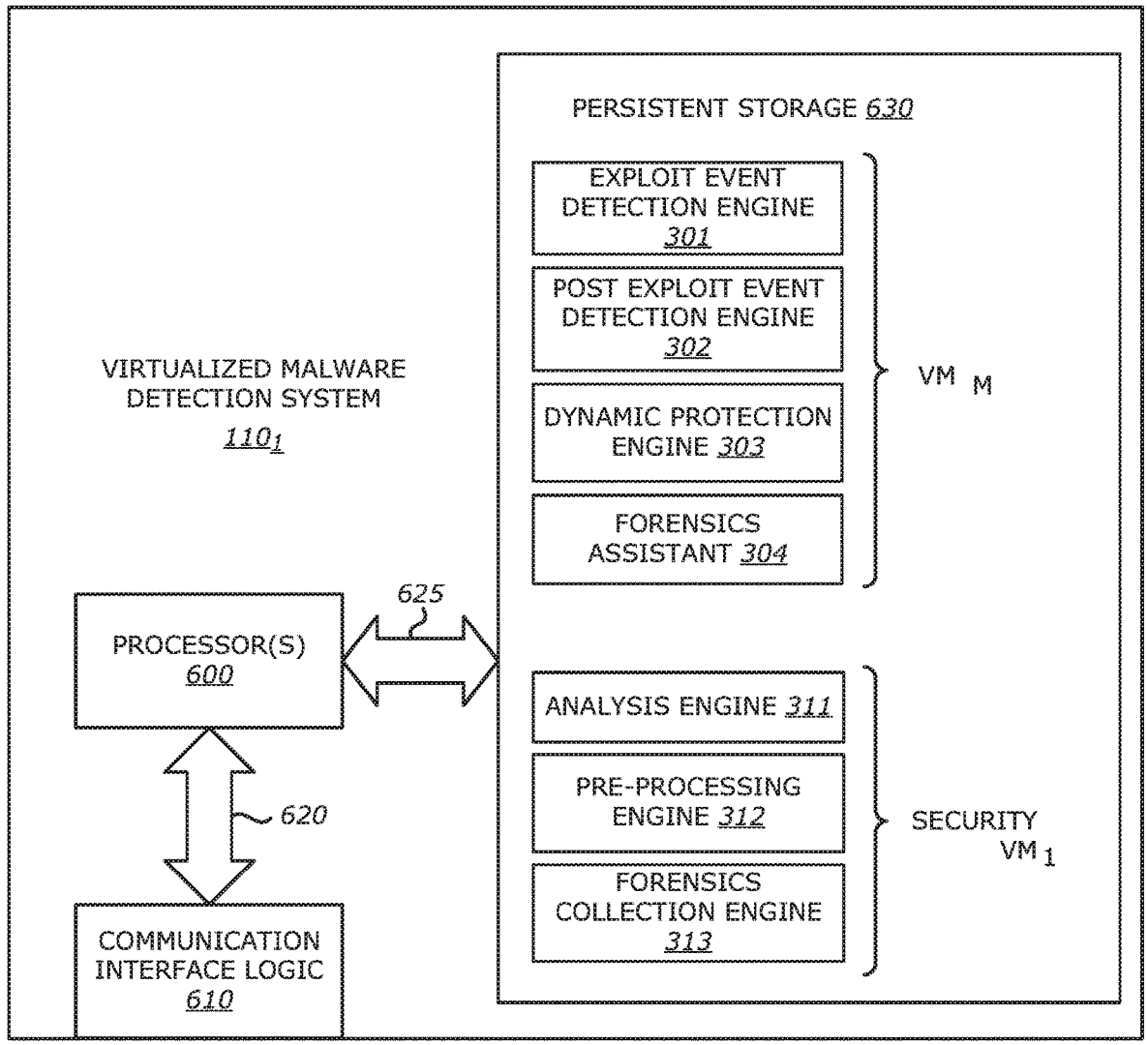
FIG. 6 is an exemplary block diagram of logic associated with the detection system $110_1$ of FIG. 1.

Referring now to FIG. 6, an exemplary block diagram of logic associated with the detection system $110_1$ of FIG. 1 is shown. The detection system $110_1$ includes one or more processors 600 that are coupled to the communication interface logic 610 via a first transmission medium 620. Communication interface logic 610 enables communication with other detection systems $110_2$-$110_3$ and management system 120 of FIG. 1. According to one embodiment of the disclosure, the communication interface logic 610 may be implemented as a physical interface including one or more ports for wired connectors. Additionally, or in the alternative, communication interface logic 610 may be implemented with one or more radio units for supporting wireless communications with other network devices.

The one or more processors 600 are further coupled to the persistent storage 630 via the transmission medium 625. According to one embodiment of the disclosure, the persistent storage 630 may include (i) the $VM_M$ including the exploit event detection engine 301, the post exploit event detection engine 302, the dynamic protection engine 303 and the forensics assistant 304; and (ii) the security $VM_1$ including the analysis engine 311, the pre-processing engine 312 and the forensics collection engine 313. Of course, when implemented as hardware (such as circuitry and/or programmable logic arrays), one or more of these logic units could be implemented separately from each other. In addition, one or more of these logic units may be implemented in hardware while one or more logic units may be implemented as software.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A virtualized malware detection system comprising:
a controller; and
a memory communicatively coupled to the controller and including one or more virtual hosts, the one or more virtual hosts comprises a first virtual host including a plurality of virtual resources and a secondary virtual resource, the plurality of virtual resources includes a first virtual resource configured to conduct an analysis of an object to detect any of a set of events, and the secondary virtual resource, operating concurrently with the first virtual resource, to receive information associated with the detected event,
wherein after processing an object by the first virtual resource and responsive to the detected event, the first virtual resource provides the object and information associated with the detected event to the secondary virtual resource while continuing to process the object and gathering post-processing information during continued processing of the object,
wherein the secondary virtual resource conducts an analysis of the object and the information associated with the detected event using correlation rules, determines a first score for the object based on the analysis, compares the first score to a first threshold, and upon the first score exceeding the first threshold, the secondary virtual resource requests the post-processing information from the first virtual resource to determine a second score for the object based on the post-processing information and the information of the event, and
wherein the secondary virtual resource determines that the object is malicious and generates an alert in response to the second score exceeding a second threshold.

2. The virtualized malware detection system of claim 1, wherein each of the plurality of virtual resources corresponds to a virtual machine including the first virtual resource corresponding to a first virtual machine, the secondary virtual resource being a security virtual machine.

3. The virtualized malware detection system of claim 1 further comprising a network interface communicatively coupled to the controller.

4. The virtualized malware detection system of claim 2, wherein the one or more virtual hosts includes the first virtual host to be utilized by a first enterprise and a second virtual host to be utilized by a second enterprise different than the first enterprise.

5. The virtualized malware detection system of claim 1, wherein the first virtual host comprises the plurality of virtual resources including a first plurality of virtual resources corresponding to a first plurality of virtual machines to be utilized by a first enterprise and a second plurality of virtual resources corresponding to a second plurality of virtual machines to be utilized by a second enterprise different than the first enterprise.

6. The virtualized malware detection system of claim 5, wherein the secondary virtual resource corresponds to a security virtual machine accessible by both the first plurality of virtual machines utilized by the first enterprise and the second plurality of virtual machines utilized by the second enterprise.

7. The virtualized malware detection system of claim 2, wherein prior to processing the object by the first virtual machine, the security virtual machine to perform a pre-processing based on identifying information of the object provided by the first virtual machine, wherein the pre-processing includes a comparison of the identifying information with content associated with at least one of a whitelist or a blacklist.

8. The virtualized malware detection system of claim 2, wherein prior to processing the object by the first virtual machine, the security virtual machine to perform a pre-processing based on identifying information of the object provided by the first virtual machine, wherein the pre-processing includes a signature check of the identifying information of the object.

9. The virtualized malware detection system of claim 2, wherein the information associated with the detected event includes information associated with an event that, through at least one of experiential knowledge or machine learning techniques, has been determined to have an association with a malicious attack.

10. The virtualized malware detection system of claim 9, wherein the detected event is an attempt to perform at least one of: (i) deleting a first file or a first directory, (ii) creating a second file or second directory, (iii) establishing communication with an external server, (iv) protecting a file or directory with a password, or (v) encrypting a third file or a third directory.

11. The virtualized malware detection system of claim 2, wherein the security virtual machine being configured to, upon determining the object is malicious, generate the alert to notify one or more of (i) a user of an endpoint device, (ii) a network administrator or (iii) an expert network analyst.

12. The virtualized malware detection system of claim 11, wherein the alert is provided to the one or more of a user of an endpoint device, a network administrator or an expert network analyst through a security appliance.

13. The virtualized malware detection system of claim 2, wherein the security virtual machine of the first virtual host being configured to uploading information associated with the object to cloud services for subsequent access upon determining the object is malicious.

14. A virtualized malware detection system comprising:
a controller;
a memory communicatively coupled to the controller and including a first virtual host, the first virtual host includes a first plurality of virtual resources and a first security virtual resource communicatively coupled to each of the first plurality of virtual resources, the first plurality of virtual resources includes a first virtual resource configured to conduct an analysis of an object to detect any of a set of events, and the first security virtual resource, operating concurrently with the first virtual resource, to receive information associated with the detected event,
wherein after processing an object by the first virtual resource and responsive to the detected event, the first virtual resource provides the object and information associated with the detected event to the first security virtual resource while continuing to process the object and gathering post-processing information during continued processing of the object,
wherein the first security virtual resource conducts an analysis of the object and the information associated with the detected event using correlation rules, determines a first score for the object based on the analysis, compares the first score to a first threshold, and upon the first score exceeding the first threshold, the first security virtual resource requests the post-processing information from the first virtual resource to determine a second score for the object based on the post-processing information and the information of the event, and
wherein the first security virtual resource determines that the object is malicious and generates an alert in response to the second score exceeding a second threshold.

15. The virtualized malware detection system of claim 14, wherein
a first virtual resource of the first plurality of virtual resources conducting an analysis of the object to detect any of the set of events being the detected event previously determined to be associated with a malicious attack; and
the first security virtual resource to receive information associated with the detected event and to conduct a secondary analysis of information associated with the detected event to determine whether the object is suspicious to warrant further analysis by the first virtual resource in determining whether the object is to be labeled as malicious or non-malicious.

16. The virtualized malware detection system of claim 14, wherein the memory further comprises a second virtual host communicatively coupled to the controller, the second virtual host includes a second plurality of virtual resources and a second security virtual resource,
wherein the first virtual host is to be utilized by a first enterprise and the second virtual host to be utilized by a second enterprise different than the first enterprise.

17. The virtualized malware detection system of claim 14, wherein a first subset of virtual resources being part of the first plurality of virtual resources are utilized by a first enterprise and a second subset of virtual resources being part of the first plurality of virtual resources are utilized by a second enterprise different than the first enterprise, the first subset of virtual resources being mutually exclusive from the second subset of virtual resources.

18. The virtualized malware detection system of claim 17, wherein the first security virtual resource is utilized by both the first subset of virtual resources utilized by the first enterprise and the second subset of virtual resources utilized by the second enterprise.

19. The virtualized malware detection system of claim 16, wherein the first plurality of virtual resources corresponds to a first plurality of virtual machines, the first security virtual resource corresponds to a first security virtual machine, the second plurality of virtual resources corresponds to a second plurality of virtual machines, and the second security virtual resource corresponds to a second security virtual machine.

20. The virtualized malware detection system of claim 14, wherein the information associated with the detected event includes information associated with an event that, through at least one of experiential knowledge or resource learning techniques, has been determined to have an association with a malicious attack.

21. The virtualized malware detection system of claim 14, wherein the first virtual host comprises a hypervisor to manage communications between the first plurality of virtual resources and the first security virtual resource.

22. The virtualized malware detection system of claim 16, wherein the first virtual host comprises a first hypervisor to manage communications between the first plurality of virtual resources and the first security virtual resource and the second virtual host comprises a second hypervisor to manage communications between the second plurality of virtual resources and the second security virtual resource.

23. The virtualized malware detection system of claim 14, wherein the first score exceeding the first threshold when the first score is greater than the first threshold.

24. The virtualized malware detection system of claim 1, wherein the first score exceeding the first threshold when the first score is greater than the first threshold.

25. The virtualized malware detection system of claim 1, wherein the first virtual host comprises a first hypervisor to manage communications between the first plurality of virtual resources and the secondary virtual resource.

* * * * *